United States Patent
Miao et al.

(10) Patent No.: US 11,597,812 B2
(45) Date of Patent: Mar. 7, 2023

(54) METHOD FOR PREPARING ULTRA HIGH MOLECULAR WEIGHT POLYETHYLENE COMPOSITE MATERIALS

(71) Applicant: Jiangnan University, Wuxi (CN)

(72) Inventors: Xiaojin Miao, Wuxi (CN); Meiping Wu, Wuxi (CN); Peipei Lu, Wuxi (CN); Xin Liu, Wuxi (CN); Hang Wang, Wuxi (CN); Xiu Ye, Wuxi (CN)

(73) Assignee: Jiangnan University, Wuxi (CN)

( * ) Notice: Subject to any disclaimer, the term of this patent is extended or adjusted under 35 U.S.C. 154(b) by 414 days.

(21) Appl. No.: 17/001,608

(22) Filed: Aug. 24, 2020

(65) Prior Publication Data

US 2021/0070960 A1 Mar. 11, 2021

(30) Foreign Application Priority Data

Sep. 6, 2019 (CN) .......................... 201910843451.4

(51) Int. Cl.
| | |
|---|---|
| *C08K 3/20* | (2006.01) |
| *C08J 3/28* | (2006.01) |
| *C08J 7/06* | (2006.01) |
| *B29C 43/00* | (2006.01) |
| *B29C 70/00* | (2006.01) |
| *B29C 70/58* | (2006.01) |
| *B29C 71/04* | (2006.01) |
| *C08K 3/04* | (2006.01) |
| *B29C 43/36* | (2006.01) |
| *B29C 43/52* | (2006.01) |
| *B29C 71/00* | (2006.01) |
| *B29K 23/00* | (2006.01) |
| *B29K 507/04* | (2006.01) |

(52) U.S. Cl.
CPC .............. *C08K 3/20* (2013.01); *B29C 43/003* (2013.01); *B29C 43/36* (2013.01); *B29C 43/52* (2013.01); *B29C 70/003* (2021.05); *B29C 70/58* (2013.01); *B29C 71/04* (2013.01); *C08J 3/28* (2013.01); *C08J 7/065* (2013.01); *C08K 3/042* (2017.05); *B29C 71/0009* (2013.01); *B29C 2043/366* (2013.01); *B29C 2071/0018* (2013.01); *B29K 2023/0683* (2013.01); *B29K 2507/04* (2013.01); *C08J 2323/06* (2013.01)

(58) Field of Classification Search
CPC ..... B29C 70/003; B29C 43/003; B29C 71/04; B29C 43/52; C08K 3/042; C08J 3/28
See application file for complete search history.

(56) References Cited

FOREIGN PATENT DOCUMENTS

CN 105837896 A * 8/2016 ................ C08J 3/24

OTHER PUBLICATIONS

Chen, Yuanfeng et al. "Preparation, Mechanical Properties and Biocompatibility of Graphene Oxide/ultrahigh Molecular Weight Polyethylene Composites." European polymer journal 48.6 (2012): 1026-1033. Web. (Year: 2012).*
Matsunaga, Tadashi et al. "Effect of Acoustic Cavitation on Ease of Infiltration of Molten Aluminum Alloys into Carbon Fiber Bundles Using Ultrasonic Infiltration Method." Composites. Part A, Applied science and manufacturing 38.3 (2007): 771-778. Web. (Year: 2007).*
Zhao, Yanan et al. "Ultrasonic Processing of MWCNT Nanopaper Reinforced Polymeric Nanocomposites." Polymer (Guilford) 156 (2018): 85-94. Web. (Year: 2018).*
Suñer, S. et al. "Ultra High Molecular Weight Polyethylene/ graphene Oxide Nanocomposites: Thermal, Mechanical and Wettability Characterisation." Composites. Part B, Engineering 78 (2015): 185-191. Web. (Year: 2015).*
Li, Peng et al. "Single-Walled Carbon Nanotubes/polyaniline-Coated Polyester Thermoelectric Textile with Good Interface Stability Prepared by Ultrasonic Induction." RSC advances 6.93 (2016): 9347-9353. Web. (Year: 2016).*
Ni, Zifeng et al. "The Influence of Irradiation on Thermal and Mechanical Properties of UHMWPE/GO Nanocomposites." Russian journal of applied chemistry 90.11 (2018): 1876-1882. Web. (Year: 2018).*

* cited by examiner

*Primary Examiner* — Marc C Howell
*Assistant Examiner* — Timothy G Hemingway
(74) *Attorney, Agent, or Firm* — Idea Intellectual Limited; Margaret A. Burke; Sam T. Yip

(57) ABSTRACT

The present invention provides a method for preparing an ultra high molecular weight polyethylene (UHMWPE) composite material including the following steps: providing a substrate material having medical grade ultra high molecular weight polyethylene powders, drying the substrate material to obtain fully dried UHMWPE powders, and pressing the fully dried UHMWPE powders to form a UHMWPE board; immersing the UHMWPE board into a graphene oxide solution and performing an ultrasonic induction by an ultrasonic processor such that the graphene oxide solution infiltrates into the UHMWPE substrate to obtain an ultra high molecular weight polyethylene composite material with excellent biocompatibility and tribological properties. The graphene oxide can be adsorbed and evenly spread on the surface of UHMWPE substrate by ultrasonic induction to form a lubricating film which can effectively reduce wear.

6 Claims, 3 Drawing Sheets

METHOD FOR PREPARING ULTRA HIGH MOLECULAR WEIGHT POLYETHYLENE COMPOSITE MATERIALS

CROSS-REFERENCES TO RELATED APPLICATIONS

This application claims priority from the Chinese Patent Application Number 2019108434514 filed on Sep. 6, 2019, and the disclosure of which is incorporated herein by reference in its entirety.

FIELD OF THE INVENTION

The invention relates to the technical field of polymer material, in particular to method for preparing ultra high molecular weight polyethylene composite materials.

BACKGROUND OF THE INVENTION

With the rapid aging of the population, patients with bone and joint problems are increasing year by year. At the present, damage joint replacement is the common clinical treatment for patients with joint problem. Therefore, materials for joint replacement play the crucial role for the successful treatment. Ultra high molecular weight polyethylene (UHMWPE) is an ideal medical polymer material, which has been widely used in the field of artificial joint replacement due to its low friction coefficient, biocompatibility, excellent wear resistance and corrosion resistance. However, UHMWPE will be worn and oxidized seriously in the long-term usage, which will produce wear debris and lead to osteolysis, aseptic loosening and invalid in the end. Then, it is necessary to reimplant the joint, which will cause secondary injury to the patient. Therefore, in order to alleviate the pain of patients and improve the life cycle of UHMWPE, it is of great importance to further improve the bio-tribological properties of UHMWPE.

Graphene oxide (GO) has excellent mechanical properties and self-lubricating properties, which can effectively improve the wear resistance of the composite materials. It is an important material to enhance the bio-tribological properties of UHMWPE composite materials.

However, the conventional GO/UHMWPE composite materials are mostly prepared by mixing GO into UHMWPE substrate materials. Although the properties of the substrate materials are improved in some aspects, such as hydrophilic properties and wear properties, the improvement is not significant, and the mixed GO will reduce the bonding between the substrate materials, resulting in a serious decrease in the shear strength. Therefore, it is of great significance to improve the bio-tribological properties of UHMWPE composite materials by further increasing the penetration levels of GO into UHMWPE substrate without affecting the bonding strength between the substrate materials.

SUMMARY OF THE INVENTION

With respect to the above problems in the existing technology, the present invention provides a method for preparing ultra high molecular weight polyethylene composite materials with simple and easy operation steps. The technical solutions of the present invention are as follows:

A method for preparing ultra high molecular weight polyethylene composite materials comprises the following steps:

(1) Pretreatment: providing a substrate material having a medical grade ultra high molecular weight polyethylene (UHMWPE) powder and drying the substrate material to obtain a fully dried powder of UHMWPE;

(2) Molding process: performing a pre-pressing treatment by adding the dried powder into a mold in a plate vulcanizing machine and placing in an insulation box at 150 to 200° C. for 2 to 3 hours to obtain a molded powder; performing a pressing treatment on the molded powder in the plate vulcanizing machine to obtain an ultra high molecular weight polyethylene (UHMWPE) board and cooling the board to room temperature;

(3) Solution preparation: preparing a graphene oxide solution by using an absolute ethanol as solvent, wherein the mass concentration of the graphene oxide in the solution is approximately from 0.5 to 1.0%;

(4) Immersion treatment: immersing the UHMWPE board into the graphene oxide solution and sealing in a container;

(5) Ultrasonic induction process: subjecting the container having the UHMWPE board in the graphene oxide solution obtained from step (4) to ultrasonic induction by an ultrasonic processor for 4 to 12 hours at a constant temperature such that the graphene oxide solution infiltrates into the substrate material to obtain an ultra high molecular weight polyethylene composite material;

(6) Post-treatment: washing the ultra high molecular weight polyethylene composite material with deionized water for several times, and drying by an air blower.

In at least one embodiment of the present invention, the particle size of the medical grade ultra high molecular weight polyethylene powder is approximately from 4.3 to 200 μm.

In at least one embodiment of the present invention, the ultrasonic frequency of the ultrasonic processor is approximately from 10 to 15 Hz.

In at least one embodiment of the present invention, the drying treatment in step (1) is performed at 100 to 120° C. for 10 to 12 hours.

In at least one embodiment of the present invention, the pressure of said pre-pressing treatment is approximately from 5 to 10 MPa, and the time of said pre-pressing treatment is approximately from 10 to 15 minutes; wherein the pressure of said compressing treatment is approximately from 10 to 20 MPa, and the time of said compressing treatment is approximately 15 to 20 minutes.

The preparation method of the present invention is simple and the steps thereof are easy to operate. Ultrasonic induced infiltration of graphene oxide solution into UHMWPE substrate material does not affect the interface bonding between the original UHMWPE powders, and effectively reduces the mixing amount of graphene oxide, saves a lot of cost, and fully utilizes the advantages of ultrasonic induction in surface modification. On the one hand, graphene oxide has large specific surface area, excellent mechanical properties and biocompatibility, which can not only reduce the levels of adverse reactions caused by wear debris, but also improve the bio-tribological properties of the substrate materials. On the other hand, a large amount of graphene oxide can be stably adsorbed on the surface of UHMWPE substrate by ultrasonic induced infiltration of graphene oxide, which can effectively reduce wear.

DETAILED DESCRIPTION

Figure 1:
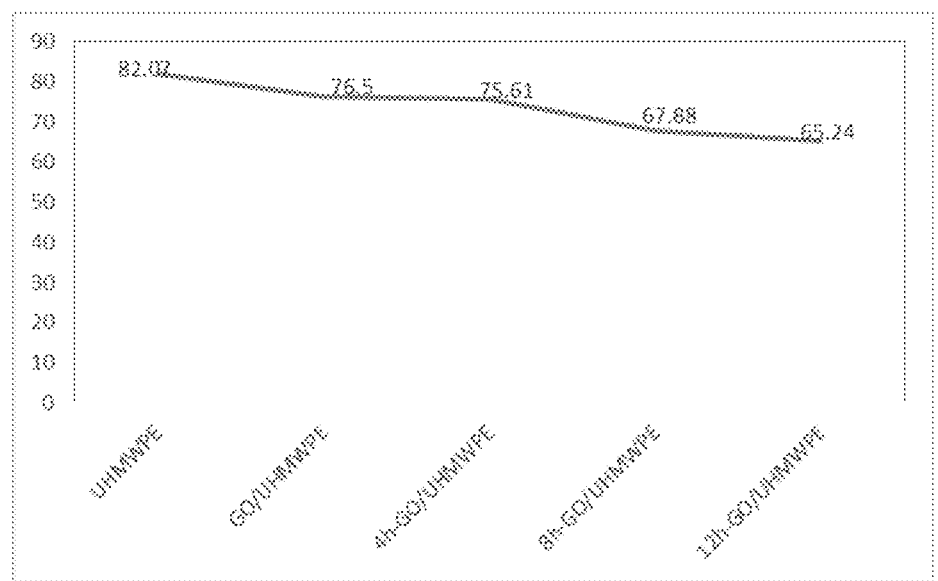
FIG. 1 shows the results of contact angle measurement of embodiments 1 to 3 and comparative examples 1 to 2 of the present invention.

Detailed description to the present invention is provided with drawings and embodiments as follows.

Embodiment 1

A method for preparing ultra high molecular weight polyethylene composite materials comprising:

(1) pre-treatment to ultra high molecular weight polyethylene powder: a substrate material having a medical grade ultra high molecular weight polyethylene powder with a particle size of approximately 4.3 µm is provided and dried completely at 100° C. for 12 hours to remove the water from the ultra high molecular weight polyethylene powder and to obtain a dried powder;

(2) Molding process: 100 g dried powder from preceding step is added into a mold, pressed at 5 MPa for 15 minutes in a plate vulcanizing machine, followed by placing thereof in an insulation box at 150° C. for 3 hours to obtain the molded powder. The mold with the molded powder is removed, placed in the plate vulcanizing machine and the molded powder is pressed at 10 MPa for 20 minutes to obtain a UHMWPE board, and the board is cooled to 23° C.

(3) Solution preparation: 0.5 g graphene oxide powder is weighed and added into the 100 ml absolute ethanol to obtain a solution with GO at 0.5% mass concentration.

(4) Immersion treatment: the UHMWPE board with UHMWPE as substrate material are immersed into a beaker containing the solution with 0.5% mass concentration of GO, and the beaker is sealed in the fresh-keeping film;

(5) Ultrasonic induction process: the UHMWPE board immersed in the graphene oxide solution is subjected to ultrasonic induction by an ultrasonic processor at 37° C. for 4 hours such that the graphene oxide solution would infiltrate into the UHMWPE substrate material homogenously to obtain a ultra high molecular weight polyethylene composite material with improved bio-tribiological properties.

(6) Post-treatment: GO/UHMWPE composite material is taken by forceps, washed with deionized water and dried by an air blower.

Embodiment 2

A method for preparing ultra high molecular weight polyethylene composite materials comprising:

(1) pre-treatment to ultra high molecular weight polyethylene powder: a substrate material having a medical grade ultra high molecular weight polyethylene powder with the particle size approximately 100 µm is provided and dried completely at 100° C. for 12 hours to remove the water from the ultra high molecular weight polyethylene powder and to obtain a dried powder;

(2) Molding process: 100 g dried powder from preceding step is added into a mold, pressed at 5 MPa for 20 minutes in a plate vulcanizing machine, followed by placing thereof in a insulation box at 200° C. for 2 hours to obtain the molded powder. The mold with the molded powder is removed, placed in the plate vulcanizing machine and the molded powder is pressed at 10 MPa for 30 minutes to obtain a UHMWPE board and the board is cooled to 23° C.

(3) Solution preparation: 1 g graphene oxide powder is weighed and added into the 100 ml absolute ethanol to obtain a solution with GO at 1% mass concentration.

(4) Immersion treatment: the UHMWPE board with UHMWPE as substrate material are immersed into a beaker containing the solution with 1% mass concentration of GO and the beaker is sealed in the fresh-keeping film;

(5) Ultrasonic induction process: the UHMWPE board immersed in the graphene oxide solution is subjected to ultrasonic induction by an ultrasonic processor at 37° C. for 8 hours such that the graphene oxide solution would infiltrate into the UHMWPE substrate material homogenously to obtain a ultra high molecular weight polyethylene composite material with improving bio-tribiological properties.

(6) Post-treatment: GO/UHMWPE composite material is taken by forceps, washed with deionized water and dried by an air blower.

Embodiment 3

A method for preparing ultra high molecular weight polyethylene composite materials comprising:

(1) pre-treatment to ultra high molecular weight polyethylene powder: a substrate material having a medical grade ultra high molecular weight polyethylene powder with the particle size approximately 200 µm is provided and dried completely at 120° C. for 10 hours to remove the water in the ultra high molecular weight polyethylene powder and to obtain a dried powder;

(2) Molding process: 100 g dried powder from preceding step is added into a mold, pressed at 10 MPa for 10 minutes in a plate vulcanizing machine, followed by placing thereof in a insulation box at 200° C. for 2 hours to obtain the molded powder. The mold with the molded powder is removed, placed in the plate vulcanizing machine and the molded powder is pressed at 10 MPa for 15 minutes to obtain a UHMWPE board and cool the board to 23° C.

(3) Solution preparation: 0.5 g graphene oxide powder is weighed and added into the 100 ml absolute ethanol to obtain a solution with GO at 0.5% mass concentration.

(4) Immersion treatment: the UHMWPE board with UHMWPE as substrate material are immersed into a beaker containing the solution with 0.5% mass concentration of GO and the beaker is sealed in the fresh-keeping film;

(5) Ultrasonic induction process: the UHMWPE board immersed in the graphene oxide solution is subjected to ultrasonic induction by an ultrasonic processor at 37° C. for 12 hours such that the graphene oxide solution would infiltrate into the UHMWPE substrate material homogenously to obtain a ultra high molecular weight polyethylene composite material with improving bio-tribiological properties.

(6) Post-treatment: GO/UHMWPE composite material is taken by forceps, washed with deionized water and dried by an air blower.

Comparative Example 1: ultra high molecular weight polyethylene board

Comparative Example 2: A Method for Preparing GO/UHMWPE Composite Material without the Treatment of the Ultrasonic Induction FIG. 1 shows the results of contact angle, where the embodiment 1 to 3 and comparative example 1 to 2 are tested in a body fluid simulation environment.

Figure 2:
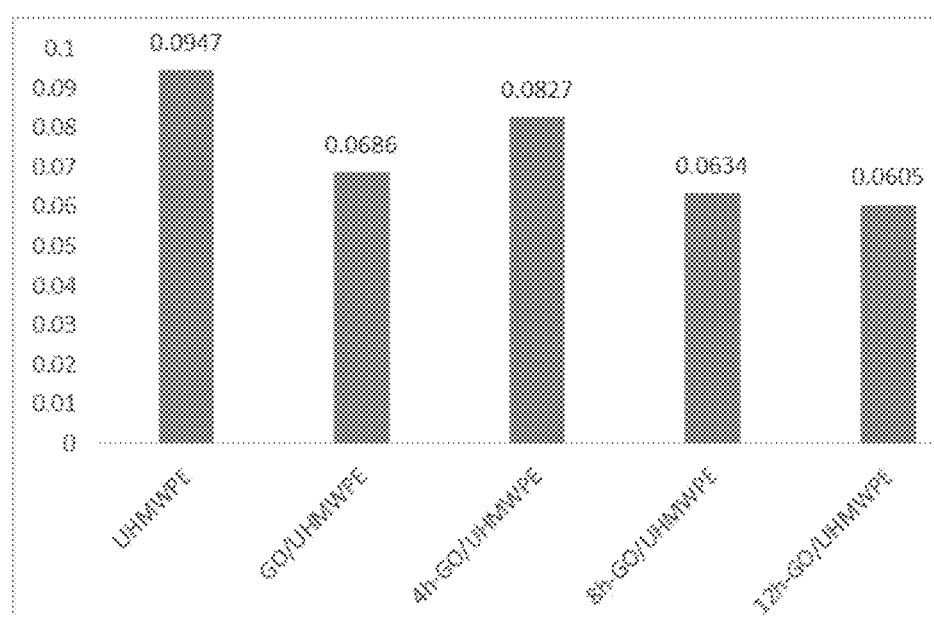
FIG. 2 shows the results of friction coefficient of embodiments 1 to 3 and comparative examples 1 to 2 of the present invention.

FIG. 2 shows the results of friction coefficient, where the friction coefficients of embodiment 1 to 3 and comparative example 1 to 2 are tested in the friction and wear testing machine with the wear $Si_3N_4$ balls having the diameter of 6 mm. The experimental parameters are as followings: load 15 N; sliding distance 10 mm; sliding time 30 minutes; frequency 1 Hz; the average value shown in FIG. 2 are calculated after three tests.

Figure 3:
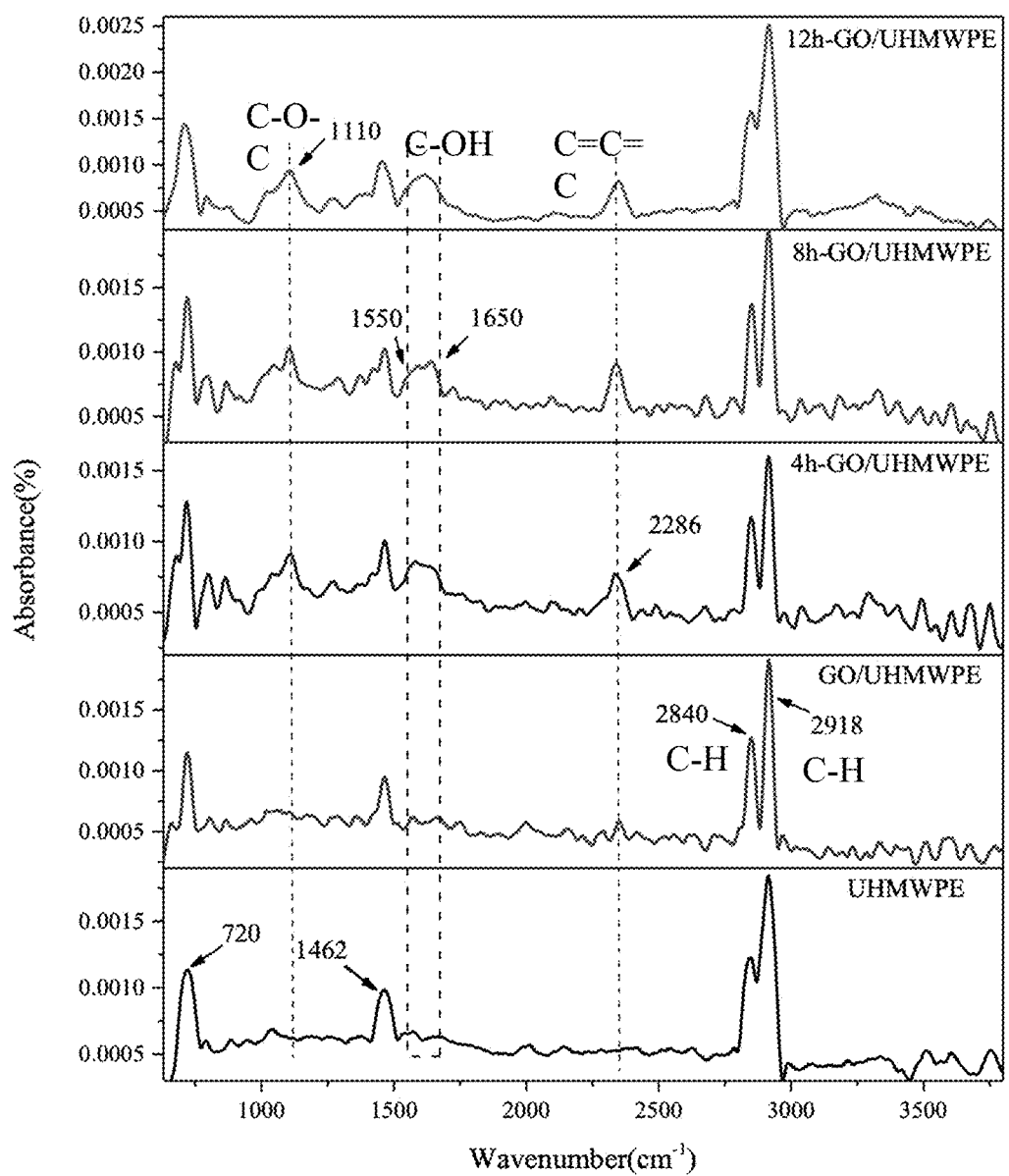
FIG. 3 shows the FTIR results of embodiments 1 to 3 and comparative examples 1 to 2 of the present invention.

As show in FIG. 3, after mixing UHMWPE with GO, the conventional GO/UHMWPE composite material does not show a significant absorption peak, which indicates that GO does not react with UHMWPE and does not generate new chemical bonds. However, when GO infiltrates into UHMWPE substrate material by ultrasonic induction, the GO/UHMWPE composite material shows a significant absorption peak at 1110 $cm^{-1}$. This is because GO contains a large amount of oxygen-containing functional groups to form hydrogen bonds with water molecules. This indirectly proves that GO is able to adhere to the surface of UHMWPE under the action of the ultrasonic wave.

As shown in above results for the embodiment 3, the friction coefficient of GO/UHMWPE composite material after ultrasonic induction for 12 hours is 0.0605 and the contact angle is 20.51% lower than that of the untreated UHMWPE. The FTIR results show that GO adheres well to the substrate surface of UHMWPE under ultrasonic induction, and the friction coefficient is 10% lower than that of the conventional GO/UHMWPE composite material prepared by mixing GO only, leading to the improvement of bio-tribiological properties.

What is claimed is:

1. A method for preparing an ultra high molecular weight polyethylene composite material comprising:
   providing a substrate material having a medical grade ultra high molecular weight polyethylene powder and drying the substrate material to obtain a dried powder;
   performing a pre-pressing treatment by adding the dried powder into a mold in a plate vulcanizing machine and placing in an insulation box at a temperature of approximately 150 to 200° C. for 2 to 3 hours to obtain a molded powder;
   pressing the molded powder in the plate vulcanizing machine to obtain an ultra high molecular weight polyethylene board and cooling thereof to room temperature;
   preparing a graphene oxide solution by addition of graphene oxide to an absolute ethanol, wherein the solution comprises graphene oxide at a mass concentration of approximately 0.5 to 1.0%;
   immersing the ultra high molecular weight polyethylene board into the graphene oxide solution in a container and sealing the container;
   subjecting the container having the ultra high molecular weight polyethylene board immersed into the graphene oxide solution to ultrasonic induction by an ultrasonic processor for 4 to 12 hours at a constant temperature such that the graphene oxide solution infiltrates into the substrate material to obtain an ultra high molecular weight polyethylene composite material;
   washing the ultra high molecular weight polyethylene composite material with deionized water for several times, and drying thereof by a blower.

2. The method of claim 1, wherein the medical grade ultra high molecular weight polyethylene powder has a particle size of approximately 4.3 to 200 µm.

3. The method of claim 1, wherein the ultrasonic induction is performed at a frequency of approximately 10 to 15 Hz.

4. The method of claim 1, wherein said drying of the substrate material is performed at 100 to 120° C. for 10 to 12 hours.

5. The method of claim 1, wherein said pre-pressing treatment is performed under a pressure of approximately 5 to 10 MPa for approximately 10 to 15 minutes.

6. The method of claim 1, wherein said pressing is performed under a pressure of approximately 10 to 20 MPa for approximately 15 to 20 minutes.

* * * * *